United States Patent
Vincent et al.

(10) Patent No.: US 6,839,732 B1
(45) Date of Patent: Jan. 4, 2005

(54) EFFICIENT USE OF DOMAIN SOCKET PAIRS IN COMMUNICATION FOR TIGHTLY COUPLED TRANSACTIONS

(75) Inventors: Tim J. Vincent, Toronto (CA); Xun Xue, Scarborough (CA); Hebert W. Pereyra, Toronto (CA); Peter K. L. Shum, Richard Hill (CA); Jon A. Lind, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 09/617,637

(22) Filed: Jul. 17, 2000

(30) Foreign Application Priority Data

Dec. 22, 1999 (CA) .............................................. 2293062

(51) Int. Cl.[7] ........................ G06F 15/16; G06F 17/30
(52) U.S. Cl. ...................... 709/202; 709/227; 709/229; 707/10
(58) Field of Search ................................ 709/101–104, 709/201–203, 227–229, 238, 243–244; 707/10

(56) References Cited

U.S. PATENT DOCUMENTS

| | | | | |
|---|---|---|---|---|
| 6,073,177 A | * | 6/2000 | Hebel et al. ................. | 709/228 |
| 6,105,067 A | * | 8/2000 | Batra .......................... | 709/227 |
| 6,243,751 B1 | * | 6/2001 | Chatterjee et al. .......... | 709/226 |
| 6,334,114 B1 | * | 12/2001 | Jacobs et al. ................. | 705/26 |
| 6,345,291 B2 | * | 2/2002 | Murphy et al. ............. | 709/208 |
| 6,370,583 B1 | * | 4/2002 | Fishler et al. ............... | 709/238 |
| 6,425,017 B1 | * | 7/2002 | Dievendorff et al. ....... | 719/315 |
| 6,477,569 B1 | * | 11/2002 | Sayan et al. ................. | 709/223 |
| 6,760,733 B1 | * | 7/2004 | Komine et al. ............. | 707/102 |

OTHER PUBLICATIONS

JetNet/BEA Tuxedo Guide "Chapter 8 . BEA Tuxedo Features" Retrieved from http://www.prolifics.com/docs/panther/html/jet_html/jntuxedo.htm on Sep. 29, 2004.*
DB2 Documentation Guide, "The World of DB2 Universal Database", https://aurora.vcu.edu/db2help/db2d0/frame3.htm#db2d0216.*
Corcoran, Peter, "Mapping Home–Network Appliances to TCP/IP Sockets" 1998 IEEE.*
Heindel et al. "Gueued Transaction Processing within the Unix Operating System Environment" 1993 IEEE.*

* cited by examiner

*Primary Examiner*—William A. Cuchlinski, Jr.
*Assistant Examiner*—Tam T. Phan
(74) *Attorney, Agent, or Firm*—Gregory M. Doudnikoff

(57) ABSTRACT

A gateway provides communication of tightly coupled XA transactions to a server hosting a DBMS and makes efficient use of domain socket pairs to implement demultiplexing in the gateway. The gateway includes a TCP/IP listener process which accepts connection requests from a transaction manager. Logical agents represent the application connection and are managed by a logical agent scheduler and are passed within the gateway using domain socket pairs. Gateway agents are dedicated to identified tightly coupled XA transactions to provide tightly coupled XA transaction support for DBMS systems which do not provide such support directly. The domain socket pairs in the gateway are assigned to logical agent schedulers and are available in a domain socket pool. A wait queue is provided to buffer logical agents when connection to the server is not available or where there are no domain socket pairs available in the domain socket pool. The wait queue is itself implemented as a domain socket pair.

14 Claims, 2 Drawing Sheets

EFFICIENT USE OF DOMAIN SOCKET PAIRS IN COMMUNICATION FOR TIGHTLY COUPLED TRANSACTIONS

BACKGROUND OF THE INVENTION

1. Field of the Invention

The present invention is directed to an improvement in computing systems and in particular to computing systems which provide for the efficient use of domain socket pairs in communication for tightly coupled transactions.

2. Description of the Related Art

In the processing of transactional data, it is common to have a DBMS (database management system) which stores data for retrieval and updating by transactions which are processed by one or more distinct branches of an application. In such systems it is known to include gateways which provide for connections between the application system or systems and a server system which hosts the DBMS. Software has been developed based on the X Open standard XA for handling transactions in such an environment. Commercial systems such as CICS™ and BEA Tuxedo™ provide transaction control for an application, based on the XA model. (CICS is a trademark of the IBM Corporation; BEA Tuxedo is a trademark of BEA Systems, Inc.) XA permits several different connections to be established between an application, a gateway and the server hosting the DBMS.

However, certain DBMSs do not directly support XA. Such a system typically employs a rigid connection pattern to prevent connections being made in a way which will permit execution of transaction operations in the DBMS which are unintended by the applications using the DBMS.

It is therefore desirable to have a computer system for the connection of applications to a server hosting a non-XA supporting DBMS by way of a gateway which supports the XA standard while providing flexibility in the connectivity between the application and the gateway.

SUMMARY OF THE INVENTION

According to one aspect of the present invention, there is provided an improved system for the efficient use of domain socket pairs in communication for tightly coupled transactions.

According to another aspect of the present invention, there is provided a computer system for providing a gateway between a transaction manager for managing database transactions from a set of applications, and a server, the computer system including a listener process for receiving inbound connection requests from the transaction manager, a set of gateway agents for establishing connections to the transaction manager for receiving transaction requests and for establishing connections to the server, a wait queue, a logical agent scheduler for managing sets of logical agents, a logical agent comprising data representing a connected application from the transaction manager, each logical agent having an associated inbound connection identifier, whereby the logical agent scheduler passes a selected logical agent and an associated inbound connection identifier to an available gateway agent and where the gateway has no available gateway agent, providing the logical agent and the associated inbound connection identifier to the wait queue, a selected gateway agent removes a logical agent and an associated inbound connection identifier from the wait queue when the selected gateway agent is available and the wait queue is non-empty, and for a logical agent passed by the logical agent scheduler or removed from the wait queue, the gateway agent establishes a connection to the transaction manager as defined by the associated inbound connection identifier and establishing a connection to the server to implement the logical agent.

According to another aspect of the present invention, there is provided the above computer system in which the gateway implements tightly coupled XA transactions from the set of applications by dedicating a single gateway agent to any given tightly coupled XA transaction, the listener process, the logical agent scheduler and the gateway agents passing logical agents to gateway agents such that any logical agent representing a transaction in that given tightly coupled XA transaction will be executed by a given gateway agent dedicated to that given tightly coupled XA transaction.

According to another aspect of the present invention, there is provided the above computer system having a free agent list indicating which gateway agents are available for connection to the transaction manager and which are not dedicated to any given tightly coupled XA transaction.

According to another aspect of the present invention, there is provided the above computer system which is implemented in a UNIX™-based environment in which the connections to the transaction manager are TCP/IP socket pairs and in which the passing of logical agents and associated inbound connection endpoint identifiers is implemented by the use of domain socket pairs in the gateway. (UNIX is a registered trademark of the Open Group.)

According to another aspect of the present invention, there is provided the above computer system in which the wait queue is implemented as a domain socket pair in the gateway.

According to another aspect of the present invention, there is provided the above computer system in which domain sockets are assigned such that the logical agent scheduler has a domain socket pair dedicated for receiving logical agent and associated inbound connection pairs from the gateway agents and the listener process, and the domain socket pairs for other communication in the gateway are obtained from a pool of domain sockets, whereby in the case that no domain socket pair is available in the domain socket pool for transfer of a logical agent and associated inbound connection pair the logical agent scheduler will place the logical agent and associated inbound connection pair in the domain socket pair which implements the wait queue.

According to another aspect of the present invention, there is a gateway for demultiplexing connections from a first system to a second system, the gateway comprising internal processes which are selectively connected to implement the demultiplexing function of the gateway, the gateway including a wait queue, the wait queue providing a buffering function for both the connections between the first system and the second system and for the connections between the internal processes.

According to another aspect of the present invention, there is provided the above gateway in which the connections between the first system and the second system are TCP/IP socket pairs and the connections between the internal processes are domain socket pairs, and in which the wait queue is implemented by a domain socket pair.

According to another aspect of the present invention, there is provided a computer system for demultiplexing a set of TCP/IP inbound connections to a set of Outbound connections, the computer system including a plurality of scheduler processes for providing TCP/IP inbound connections to agent processes for establishing corresponding Outbound connections, the scheduler processes and the agent processes communicating by domain socket pairs in the computer system, each scheduler process having a dedicated domain socket pair for receiving a TCP/IP inbound connection endpoint, the domain socket pairs for communication to the agent processes being available from a pool of domain sockets.

According to another aspect of the present invention, there is provided the above computer system including a wait queue implemented as a domain socket pair, the wait queue receiving a TCP/IP inbound connection endpoint where no agent process is available for implementing the TCP/IP inbound connection and from which non-empty wait queue an available agent process will remove a TCP/IP inbound connection endpoint to establish a TCP/IP inbound connection and an outbound connection.

According to another aspect of the present invention, there is provided a computer program product for use with a computer including a central processing unit and random access memory, said computer program product including a computer usable medium having computer readable code means embodied in the medium providing a gateway as described above.

Advantages of the present invention include a gateway which supports an agent affinity for all connections for transactions participating in a global transaction. Server resources are reduced for each application by demultiplexing inbound connections to a smaller number of connections to the DBMS server. Multiple applications are able to be demultiplexed to a single outbound connection on well defined boundaries.

BRIEF DESCRIPTION OF THE DRAWINGS

The preferred embodiment of the invention is shown in the drawings, wherein.

Figure 1:
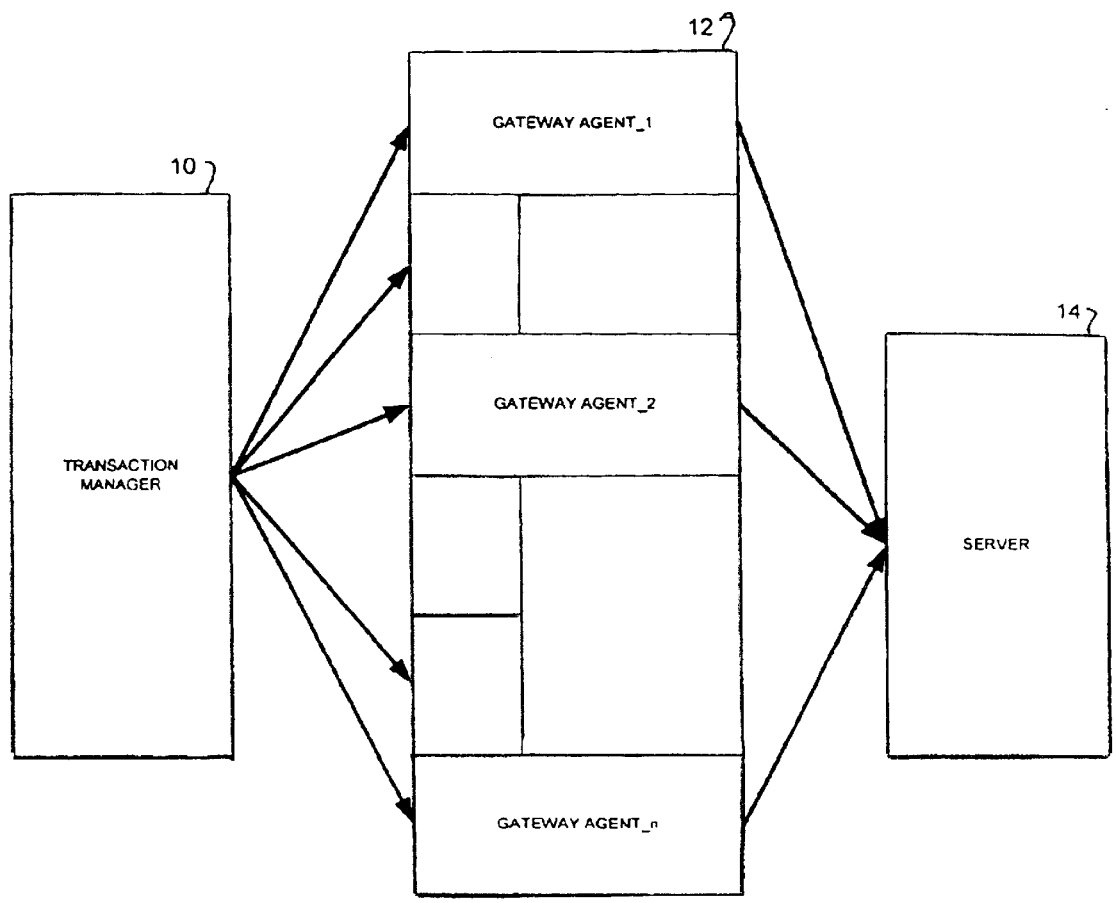
FIG. 1 is a block diagram illustrating an example transaction manager and a server connected by a gateway according to the preferred embodiment of the invention.

In the drawings, the preferred embodiment of the invention is illustrated by way of example. It is to be expressly understood that the description and drawings are only for the purpose of illustration and as an aid to understanding, and are not intended as a definition of the limits of the invention.

DESCRIPTION OF THE PREFERRED EMBODIMENT

FIG. 1 is a block diagram illustrating an example transaction manager 10, gateway 12, and server 14. Server 14 hosts a DBMS which does not directly support the XA protocol. Gateway 12 has multiple agents represented in the example of FIG. 1 as gateway agent_1, gateway agent_2, ... gateway agent_n. The gateway agents in the example of FIG. 1 are Unix processes which establish connections between transaction manager 10 and server 14, using TCP/IP sockets. It will be appreciated by those skilled in the art that other types of connection to server 14 are also possible. As is shown in FIG. 1, transaction manager 10 has many potential connections to gateway 12, which are selectively connected to server 14. In FIG. 1, the three gateway agents illustrated are shown connected, while other inbound connections to gateway 12 (from transaction manager 10) are not shown connected to server 14. In this way, FIG. 1 shows gateway 12 acting as a demultiplexer (or concentrator) for connections from transaction manager 10.

Figure 2:
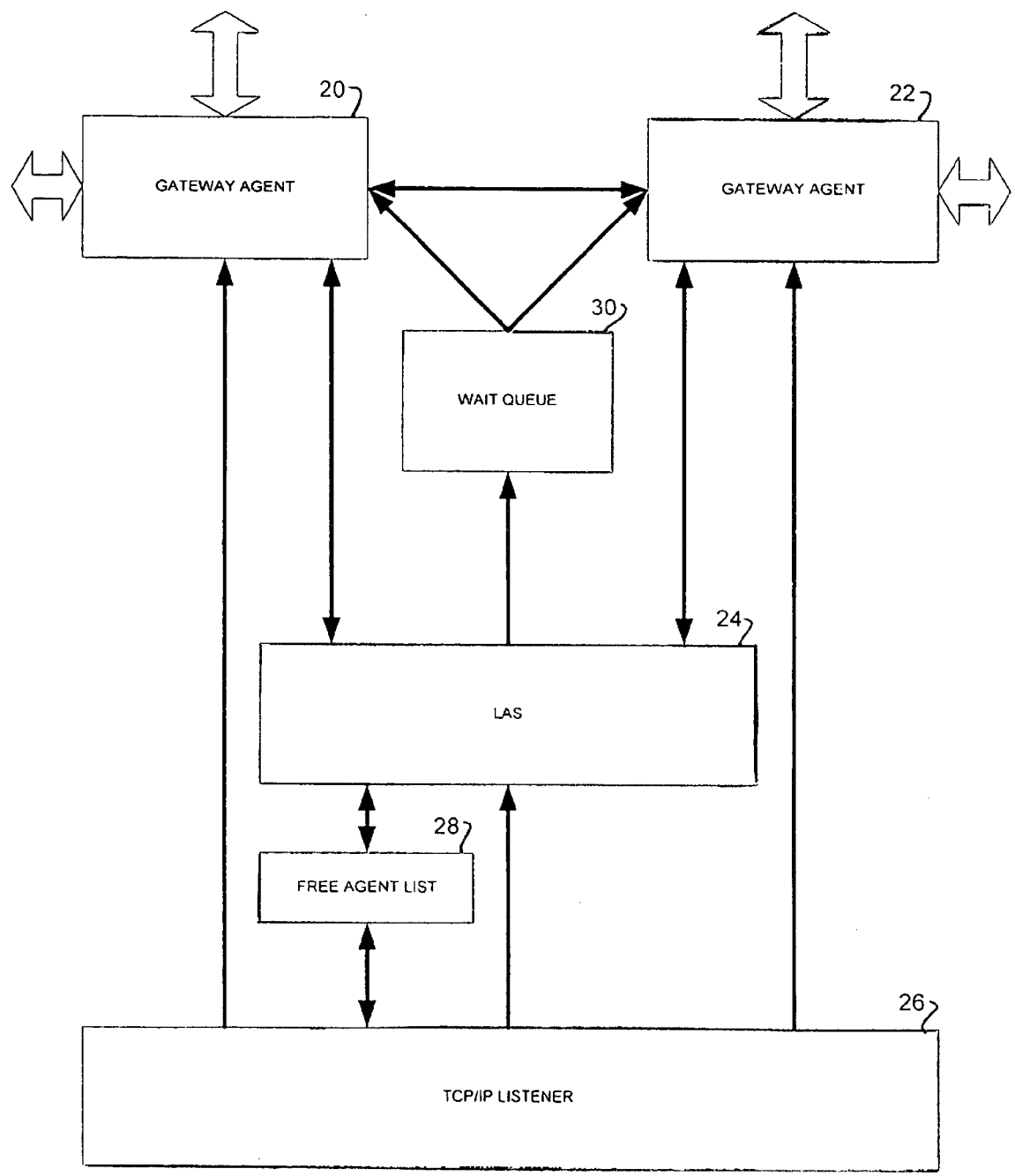
FIG. 2 is a block diagram illustrating components in the gateway of the preferred embodiment.

FIG. 2 is a block diagram illustrating a extremely simple example of the architecture of gateway 12. Gateway 12 in the example of the preferred embodiment is implemented in UNIX in a TCP/IP environment. Those skilled in the art will appreciate that the preferred embodiment may be implement in other environments with similar process and socket management structures. As shown in FIG. 1, gateway 12 manages inbound TCP/IP sockets between transaction manager 10 and gateway 12. In FIG. 2, gateway agent 20 and gateway agent 22 are shown with inbound socket connections represented by horizontal arrows. Similarly, gateway agents 20, 22 are shown with outbound socket connections (to server 14) represented by vertical arrows.

Gateway 12 in the preferred embodiment manages the connections between transaction manager 10 and server 14 by creating logical agents. A logical agent in the preferred embodiment is an entity which represents a connected application (a connection from transaction manager 10) and has associated data representing information and control blocks required by the application. A logical agent scheduler is shown in FIG. 2 as LAS 24. LAS 24 manages the relationship between logical agents and gateway agents (represented as gateway agents 20, 22 in FIG. 2). Gateway agents 20, 22 execute application requests, but have no permanent attachment to any particular application. The gateway agent owns all the information and control blocks required to implement a connection to the server for an inbound application. By dividing up agents into logical agents and gateway agents, the system of the preferred embodiment is able to achieve a demultiplexing, or concentrating, function as is set out below.

Referring to FIG. 2, TCP/IP listener 26 is shown. TCP/IP listener 26 listens for requests for a connection made by transaction manager 10. When TCP/IP listener 26 receives such a connection request, it generates a logical agent and records the associated TCP/IP inbound connection endpoint. The logical agent and the TCP/IP inbound connection endpoint are passed by the TCP/IP listener to other processes illustrated in FIG. 2 according to the availability of resources.

In UNIX platforms, TCP/IP socket endpoints may be passed between processes using domain socket pairs. FIG. 2 shows example connections for the transfer of such messages in gateway 12. Each message is sent through a connected domain socket pair. Each message contains two parts, a control part and a data part. The control part contains the inbound TCP/IP connection end-point, and the data part contains the address of the logical agent control block. This guarantees that the TCP/IP connection end-point and the logical agent that owns it always stay together during the transfer.

In the system of the preferred embodiment, gateway 12 supports XA compliant transactions and will generate connections to a server hosting a DBMS which does not support XA verbs. For example, a server with a 390 or 400 variation of DB2 UDB™ will not process XA verb statements when connecting to those servers via the X Open DRDA protocol. (DB2 and DB2 Universal Database are trademarks of the IBM Corporation.) However, gateway 12 imposes a single and exclusive gateway agent connection for all requests participating in the same tightly coupled XA transaction. In this way, all tightly coupled statements, that is all statements sharing the same transfer identifier (XID) under the XA protocol, will use the same connection to the server, even if such SQL requests are received from different applications. This will ensure that agent level affinity is achieved for the system, despite the backend DBMS system not supporting the XA protocol.

The logic which provides this connectivity functionality is found in the processes shown in FIG. 2. Gateway agents (20, 22 in the example of FIG. 2) are potentially associated with specific global transactions. When a new connection request from transaction manager 10 is received by TCP/IP listener 26, free agent list 28 is checked. If a gateway agent is on free agent list 28 then it is not associated with an ongoing global transaction. In this case, the logical agent and inbound connection identifier for the new connection are passed to the free gateway agent to create the inbound connection to the transaction manager. The gateway agent is removed from the free agent list.

In the example of FIG. 2, the connection between TCP/IP listener 26 and gateway agent 20 represents such a transfer of logical agent and inbound connection from TCP/IP listener 26 to gateway agent 20. Once the connection request is passed to gateway agent 20, then the gateway agent establishes a connection to transaction manager 10 and receives requests from transaction manager 10. If gateway agent 20 receives an XA request starting a global transaction (XA REG START) the result is a unique XID being assigned to the global transaction. The system of the preferred embodiment will then reserve that gateway agent for transactions associated with the unique XID, only. Gateway agent 20 will if necessary establish a connection (or reuse an existing connection) to server 14 and all transactions with the unique XID will be communicated to server 14 with the same connection. This results in the agent affinity aspect of the tightly coupled XA transaction model being implemented without the server 14 DBMS having direct support for that protocol.

Other connections from transaction manager 10 to gateway 12 may be used to sent transaction requests which are part of the global transaction being handled by gateway 20. In this case, those logical agents corresponding to such requests are sent to gateway agent 20, as described below. Gateway agent 20 will establish inbound socket connections to transaction manager 10 to permit those transactions to be sent to server 14 from gateway 20. Gateway 20 may also receive requests from transaction manager 10 which do not relate to the global transaction which gateway 20 is dedicated to handling. In this case, the request (as defined by the logical agent and inbound socket information) is sent to the appropriate gateway agent, as described below.

LAS 24 manages the scheduling of logical agents in the gateway. LAS 24 will determine what XID, if any, is associated with a particular logical agent. The logical agent scheduler LAS 24 will determine whether a gateway agent is dedicated to the XID for the logical agent. If there is a gateway agent which is dedicated to the XID and which is available, the logical agent is sent to that gateway agent. If there is no gateway agent available to handle the particular logical agent, the logical agent and the associated inbound connection socket identifier are placed in wait queue 30.

Due to the restriction of the number of open file handles that exists for certain platforms (for example, a maximum of 2000 on AIX™) it may be necessary to have more than one logical agent scheduler when the number of logical agents exceeds the file handle limit. (AIX is a trademark of the IBM Corporation.) This is because in protocols such as TCP/IP, sockets are file handles and one file handle is required in the logical agent scheduler per logical agent. Although the preferred embodiment is shown with reference to only a single logical agent scheduler, and only two gateway agents, it will be understood by those skilled in the art that the gateway of the invention may be scaled up to include many gateway agents for a logical agent scheduler, and many logical agent schedulers.

As is indicated by the connections shown in FIG. 2, agents in the preferred embodiment may also pass logical agents and inbound connection identifiers between each other. This is shown in the figure by the connection between gateway agent 20 and gateway agent 22. Where an inbound connection established by a gateway agent results in the passing of a transaction request for a global transaction unrelated to the gateway agent receiveing the request, the gateway agent will not pass the request on to the server. In such a case, the logical agent corresponding to the transaction request is sent to the appropriate gateway agent.

When a global transaction branch is completed, for example by receipt of the XA END by the gateway agent, the logical agent associated with that global transaction is passed back to LAS 24 to permit LAS 24 to recognize that the gateway agent is available for other requests in the global transaction. LAS 24 will look into a request received from transaction manager 10 to determine if a given transaction request is part of any defined global transaction, and if so, to pass the logical agent corresponding to the transaction request to the appropriate gateway agent (associated with the global transaction), if available, or wait queue 30, if not.

When a global transaction is committed or rolled back, the global transaction is completed and an identifier for the gateway agent is placed in free agent list 28.

As is indicated above, the architecture of gateway 12 permits many connections from transaction manager 10 to be demultiplexed to fewer connections to server 14, by gateway 12. In addition, gateway 12, by dedicating gateway agents to a single global transaction, permits the tightly coupled transaction of an XA protocol to be effectively implemented by gateway 12 and server 14 despite the lack of direct XA support in the DBMS hosted by server 14.

In the system of the preferred embodiment each of gateway agents 20, 22, TCP/IP listener 26, LAS 24, and free agent list 28 are implemented as processes in the UNIX environment.

The system of the preferred embodiment uses a particular arrangement of domain socket pairs to efficiently implement gateway 12 to make efficient use of system resources while providing a demultiplexing or concentrating function for the connection between transaction manager 10 and server 14. The system of the preferred embodiment uses a domain socket pool, in conjunction with assigned domain socket pairs, to provide an efficient mechanism for communication of local agent information in gateway 12.

A heavy loaded system may have dozens of LASs, and hundreds of gateway agents. In such a system, maintaining an large pool of domain socket pairs to handle connections between different processes may be onerous in terms of system resources. However, a too small pool of domain socket pairs with an inefficient usage algorithm may cause the transfer of logical agent information to be a performance bottleneck in the system.

Each logical agent scheduler (LAS) in the gateway has a dedicated domain socket pair. This domain socket pair acts as a single reader, multiple sender, queue. When the TCP/IP listener or a gateway agent seeks to transfer a logical agent to a logical agent scheduler, it sends a message through the send socket of the dedicated domain socket pair for that LAS. The logical agent scheduler will read from the receive socket of the domain socket pair to receive the logical agent and its TCP/IP connection end-point.

Communication to a gateway agent is performed using a domain socket pair from the pool of domain socket pairs. When a TCP/IP listener, or a gateway agent, tries to hand a logical agent to a gateway agent, it will request a domain socket pair from the free pool. The steps of acquiring and releasing domain socket pairs are protected by the pool latch.

If the process is able to find a free domain socket pair, it will send the logical agent along with the TCP/IP connection end-point through the domain socket pair to the appropriate gateway agent. When the target gateway agent receives the logical agent and the TCP/IP connection end-point, it will mark the domain socket pair to be free.

If the process cannot be provided with a free domain socket pair from the pool, the TCP/IP listener or the gateway agent that is requiring the transfer will wait on a waitpost area. The next process to free up a domain socket pair will post it and the waiting process will be able to make use of the domain socket pair.

When a logical agent scheduler seeks to transfer a logical agent to a gateway agent, it will also request a domain socket pair from the pool, as a TCP/IP listener or a gateway agent does. However, if the LAS cannot find a free domain socket pair in the domain socket pool, it will send the logical agent and its TCP/IP connection end-point to a wait queue (shown in FIG. 2 as wait queue 30). The wait queue is implemented by a dedicated domain socket pair. This domain socket pair acts as a multiple reader multiple sender queue. When a gateway agent finishes serving a transaction, it will read from this domain socket pair to get another logical agent to serve. In this way, wait queue 30 provides a function of buffering logical agents where there are no domain sockets in the pool available for LAS to gateway agent communication.

As will be apparent to those skilled in the art, the size of the domain socket pool for a given system will depend on the resources available and the expected utilization of those resources.

There is a similar buffering function carried out if there are fewer gateway agents available than required at a particular time. If a logical agent scheduler detects an incoming request from one of the applications, but there is no available gateway agent to serve the request (because there are more logical agents then gateway agents), it will also send the new logical agent to the dedicated domain socket pair forming the wait queue. A gateway agent will then remove the logical agent from the wait queue once the gateway agent is available. In this way, wait queue 30, as implemented in the preferred embodiment of the invention, provides a queue for both gateway agent resources and domain socket resources.

By assigning different domain socket pairs in this manner, an efficient use of the system resources at gateway 12 is achieved, while permitting a demultiplexing of requests from transaction manager 10 and permitting connections to server 14.

Although a preferred embodiment of the present invention has been described here in detail, it will be appreciated by those skilled in the art, that variations may be made thereto, without departing from the spirit of the invention or the scope of the appended claims.

The embodiments of the invention in which an exclusive property or privilege is claimed are defined as follows:

1. A computer system for providing a gateway between a transaction manager for managing database transactions from a set of applications, and a server, the computer system comprising:
   a listener process for receiving inbound connection requests from the transaction manager;
   a set of gateway agents for establishing connections to the transaction manager for receiving transaction requests and for establishing connections to the server;
   a wait queue; and
   a logical agent scheduler for managing sets of logical agents, a logical agent comprising data representing a connected application from the transaction manager, each logical agent having an associated inbound connection identifier,
   whereby the logical agent scheduler passes a selected logical agent and an associated inbound connection identifier to an available gateway agent and where the gateway has no available gateway agent, providing the logical agent and the associated inbound connection identifier to the wait queue,
   a selected gateway agent removes a logical agent and an associated inbound connection identifier from the wait queue when the selected gateway agent is available and the wait queue is non-empty, and
   for a logical agent passed by the logical agent scheduler or removed from the wait queue, the gateway agent establishes a connection to the transaction manager as defined by the associated inbound connection identifier and establishes a connection to the server to implement the logical agent.

2. The computer system of claim 1 in which the gateway implements tightly coupled XA transactions from the set of applications by dedicating a single gateway agent to any given tightly coupled XA transaction, the listener process, the logical agent scheduler and the gateway agents passing logical agents to gateway agents such that any logical agent representing a transaction in that given tightly coupled XA transaction will be executed by a given gateway agent dedicated to that given tightly coupled XA transaction.

3. The computer system of claim 2, further comprising a free agent list indicating which gateway agents are available for connection to the transaction manager and which are not dedicated to any given tightly coupled XA transaction.

4. The computer system of claim 2 implemented in a UNIX-based environment in which the connections to the transaction manager are TCP/IP socket pairs and in which the passing of logical agents and associated inbound connection endpoint identifiers is implemented by the use of domain socket pairs in the gateway.

5. The computer system of claim 4 in which the wait queue is implemented as a domain socket pair in the gateway.

6. The computer system of claim 5 in which domain sockets are assigned such that the logical agent scheduler has a domain socket pair dedicated for receiving logical agent and associated inbound connection pairs from the gateway agents and the listener process, and the domain socket pairs for other communication in the gateway are obtained from a pool of domain sockets,
   whereby in the case that no domain socket pair is available in the domain socket pool for transfer of a logical agent and associated inbound connection pair the logical agent scheduler will place the logical agent and associated inbound connection pair in the domain socket pair which implements the wait queue.

7. A gateway for demultiplexing connection from a first system to a second system, the gateway comprising:
   internal process which are selectively connected to implement a demultiplexing function of the gateway;
   a wait queue for providing a buffering function for both the connections between the first system and the second system and for connections between the internal process, wherein the connection between the first and second system are TCP/IP socket pairs and the connections between the internal process are domain socket pairs and wherein the wait queue is implemented by a domain socket pair.

8. A computer system for demultiplexing a set of TCP/IP inbound connections to a set of outbound connections, the computer system comprising:

a plurality of scheduler process for providing TCP/IP inbound connections to agent processes for establishing corresponding outbound connections, the scheduler processes and the agent processes communicating by domain socket pairs int the computer system, each scheduler process having a dedicated domain socket pair for receiving a TCP/IP inbound connection endpoint, the domain socket pairs for communication to the agent processes being available from a pool of domain sockets; and a wait queue implemented as a domain socket pair, the wait queue receiving a TCP/IP inbound connection endpoint where no agent process is available for implementing the TCP/IP inbound connection and from which non-empty wait queue an available agent process will remove a TCP/IP inbound connection endpoint to establish a TCP/IP inbound connection and an outbound connection.

9. A computer program product for use with a computer comprising a central processing unit and random access memory, said computer program product comprising a computer usable medium having computer readable code means embodied in said medium providing a gateway between a transaction manager for managing database transactions from a set of applications, and a server, said computer program product comprising:

computer readable program code means for implementing a listener process for receiving inbound connection requests from the transaction manager, computer readable program code means for implementing a set of gateway agents for establishing connections to the transaction manager for receiving transaction requests and for establishing connections to the server, computer readable program code means for implementing a wait queue, computer readable program code means for implementing a logical agent scheduler for managing sets of logical agents, a logical agent comprising data representing a connected application from the transaction manager, each logical agent having an associated inbound connection identifier, whereby the logical agent scheduler passes a selected logical agent and an associated inbound connection identifier to an available gateway agent and where the gateway has no available gateway agent, providing the logical agent and the associated inbound connection identifier to the wait queue, a selected gateway agent removes a logical agent and an associated inbound connection identifier from the wait queue when the selected gateway agent is available and the wait queue is non-empty, and for a logical agent passed by the logical agent scheduler or removed from the wait queue, the gateway agent establishes a connection to the transaction manager as defined by the associated inbound connection identifier and establishes a connection to the server to implement the logical agent.

10. The computer program product of claim 9 in which computer readable program code means implements tightly coupled XA transactions from the set of applications by dedicating a single gateway agent to any given tightly coupled XA transaction, the listener process, the logical agent scheduler and the gateway agents passing logical agents to gateway agents such that any logical agent representing a transaction in that given tightly coupled XA transaction will be executed by a given gateway agent dedicated to that given tightly coupled XA transaction.

11. The computer program product of claim 10 further comprising computer readable program code means for implementing a free agent list indicating which gateway agents are available for connection to the transaction manager and which are not dedicated to any given tightly coupled XA transaction.

12. The computer program product of claim 9 for implementation in a UNIX-based environment in which the connections to the transaction manager are TCP/IP socket pairs and in which computer program product the passing of logical agents and associated inbound connection endpoint identifiers is implemented by the use of domain socket pairs in the gateway, the wait queue is implemented as a domain socket pair in the gateway, the logical agent scheduler has a domain socket pair dedicated for receiving logical agent and associated inbound connection pairs from the gateway agents and the listener process, and the domain socket pairs for other communication in the gateway are obtained from a pool of domain sockets, whereby in the case that no domain socket pair is available in the domain socket pool for transfer of a logical agent and associated inbound connection pair the logical agent scheduler will place the logical agent and associated inbound connection pair in the domain socket pair which implements the wait queue.

13. A computer program product for use with a computer comprising a central processing unit and random access memory, said computer program product comprising a computer usable medium having computer readable code means embodied in said medium providing a gateway for demultiplexing connections from a first system to a second system, said computer program product comprising:

computer readable program code means for implementing internal process in the gateway which are selectively connected to implement the demultiplexing function of the gateway, and computer readable program code means for implementing a wait queue, the wait queue providing a buffering function for both the connections between the first system and the second system and for connections between the internal processes, wherein the connections between the first system and the second system are TCP/IP socket pairs and the computer readable program code means for implementing the connections between the internal processes implements such connections by using domain socket pairs, and wherein said computer readable program code means for implementing a wait queue uses a domain socket pair to implement the wait queue.

14. A computer program product for use with a computer comprising a central processing unit and random access memory, said computer product comprising a computer usable medium having computer readable code means embodied in said medium providing a computer system for demultiplexing a set of TCP/IP inbound connections to a set of outbound connections, said computer program product comprising:

computer readable program code means for implementing a plurality of scheduler processes for providing TCP/IP inbound connections to agent processes for establishing corresponding outbound connections, the scheduler processes and the agent processes communicating by domain socket pairs in the computer system, each scheduler process having a dedicated domain socket pair for receiving a TCP/IP inbound connection endpoint, the domain socket pairs for communication to the agent processes being available from a pool of domain sockets; and computer readable program code means for implementing a wait queue implemented as a domain socket pair, the wait queue receiving a TCP/IP inbound connection endpoint where no agent process is available for implementing the TCP/IP inbound connection and from which non-empty wait queue an available agent process will remove a TCP/IP inbound connection endpoint to establish a TCP/IP inbound connection and an outbound connection.

* * * * *